US008469367B2

(12) United States Patent
Yamazaki et al.

(10) Patent No.: US 8,469,367 B2
(45) Date of Patent: Jun. 25, 2013

(54) CHUCKING DEVICE FOR USE IN MACHINING EXHAUST GAS PURIFYING SYSTEM

(75) Inventors: Akira Yamazaki, Hamamatsu (JP); Yasushi Kageyama, Hamamatsu (JP); Akihiro Kawamata, Hamamatsu (JP); Tomoya Nakamura, Hamamatsu (JP)

(73) Assignee: Yutaka Giken Co., Ltd., Hamamatsu-Shi (JP)

( * ) Notice: Subject to any disclaimer, the term of this patent is extended or adjusted under 35 U.S.C. 154(b) by 947 days.

(21) Appl. No.: 12/504,212

(22) Filed: Jul. 16, 2009

(65) Prior Publication Data
US 2010/0013168 A1    Jan. 21, 2010

(30) Foreign Application Priority Data

Jul. 16, 2008    (JP) ................. 2008-184939

(51) Int. Cl.
*B23B 31/171*    (2006.01)
*B23B 31/30*    (2006.01)
(52) U.S. Cl.
USPC ............. 279/4.12; 279/74; 279/123; 72/121
(58) Field of Classification Search
USPC ............. 279/4.06, 4.09, 4.1, 4.12, 74, 122, 279/60, 65, 123; 72/121
IPC .................................................. B23B 31/171
See application file for complete search history.

(56) References Cited

U.S. PATENT DOCUMENTS

| 2,543,857 | A | * | 3/1951 | Leifer | 279/4.08 |
|---|---|---|---|---|---|
| 2,546,351 | A | * | 3/1951 | Stoner | 279/33 |
| 3,095,205 | A | * | 6/1963 | Farnsworth | 279/74 |
| 3,505,846 | A | * | 4/1970 | Smida | 72/61 |
| 3,792,869 | A | * | 2/1974 | Braun | 279/4.12 |
| 4,094,522 | A | * | 6/1978 | Hiestand | 279/4.02 |
| 4,424,977 | A | * | 1/1984 | Pruden et al. | 279/121 |
| 4,508,357 | A | * | 4/1985 | Reich | 279/4.11 |
| 4,848,779 | A | * | 7/1989 | Wheeler et al. | 279/60 |
| 5,102,152 | A | * | 4/1992 | Grund et al. | 279/2.11 |
| 5,197,748 | A | * | 3/1993 | Wu | 279/4.12 |
| 5,286,041 | A | * | 2/1994 | Rohm | 279/60 |
| 5,816,584 | A | * | 10/1998 | Miles et al. | 279/62 |
| 6,022,029 | A | * | 2/2000 | Sakamaki | 279/60 |
| 6,168,170 | B1 | * | 1/2001 | Miles et al. | 279/62 |
| 6,354,605 | B1 | * | 3/2002 | Aultman | 279/60 |
| 6,648,341 | B1 | * | 11/2003 | Gaddis et al. | 279/60 |

FOREIGN PATENT DOCUMENTS

| JP | 55-66703 | 5/1980 |
|---|---|---|
| JP | 61-31605 | 2/1986 |
| JP | 2002-038936 | 2/2002 |
| JP | 2002-239657 | 8/2002 |
| JP | 2003-074336 | 3/2003 |

* cited by examiner

*Primary Examiner* — Eric A Gates
(74) *Attorney, Agent, or Firm* — Rankin, Hill & Clark LLP

(57) ABSTRACT

A chucking device for use when an outer peripheral end part of a semi-finished product having a pillar-shaped catalyst wrapped in a mat and housed in a cylinder is spin-processed using a plurality of spinning rollers. An outer peripheral surface of the semi-finished product is chucked using a plurality of pressing pieces. Each of the pressing pieces has a contact surface for touching the cylinder of the semi-finished product, and a pair of chamfers extending radially outward from either end of the contact surface.

9 Claims, 10 Drawing Sheets

//////

CHUCKING DEVICE FOR USE IN MACHINING EXHAUST GAS PURIFYING SYSTEM

FILED OF THE INVENTION

The present invention relates to a technique for machining a system for purifying exhaust gas, wherein spin-processing is performed on an end of a cylinder.

BACKGROUND OF THE INVENTION

A variety of systems for purifying exhaust gas have been commercialized for use as effective means for complying with emissions regulations. Among these, systems constructed having a catalyst encased in a cylinder so as to be disposed inside the exhaust pipe of a vehicle are in widespread use as systems for purifying vehicle exhaust gas. Fulfilling its purifying function causes the catalyst to become larger than the diameter of the exhaust pipe. Accordingly, it is necessary to reduce the diameter of an end part of the cylinder encasing the catalyst to match the front and rear diameters of the exhaust pipe.

The process for reducing the diameter is performed using spin-processing as disclosed in, e.g., JP 2002-239657 A. The spin-processing disclosed in JP 2002-239657 A will be discussed next referring to FIGS. 8A and 8B hereof.

As shown in FIG. 8A, a cylinder 101 is clamped by a lower clamp 102 and an upper clamp 103. Next, spinning rollers 104, 104, 104, 104 are caused to rotate while being pressed against one end 105 and another end 106 of the cylinder 101, whereby the diameters of the ends 105, 106 are reduced. This type of processing is called spin-processing or spinning.

When spin-processing is performed, the spinning rollers 104 are firmly pressed against the end 105 and the other end 106 of the cylinder 101; therefore, a large external force (bending force or torsion force) is applied to the cylinder 101.

The cylinder 101 is accordingly clamped securely between the lower clamp 102 and the upper clamp 103, as shown in FIG. 8B, so that the cylinder 101 will not move.

FIG. 9 shows a conventional clamp. In FIG. 8A the catalyst and the mat are not shown; however, in exhaust gas purification systems, a pillar-shaped catalyst 109 is inserted inside the cylinder 101 with a mat 108 interposed therebetween. As is clear from FIG. 8A, the catalyst 109 cannot be inserted in the cylinder 101 once the diameters of the ends have been reduced.

Therefore, as shown in FIG. 9, a semi-finished product 110 having the pillar-shaped catalyst 109 inserted inside the cylinder 101 with the mat 108 interposed therebetween is produced before spin-processing is performed. The semi-finished product 110 is then spin-processed; i.e., the semi-finished product 110 is held firmly between the lower clamp 102 and the upper clamp 103, whereupon spin-processing is performed.

A welded tube is generally used for the cylinder 101. Welded tubes are obtained by bending a flat plate into an "O"-shape and welding the butt seams together. Inevitably, irregularities arising from the dimensions of the flat plate, gaps in the butt seam, and contracting of the weld metal during welding combine to produce irregularities in the outside diameter of the cylinder 101.

In one known manufacturing method, a pillar-shaped catalyst is wrapped with a mat and inserted in a cylinder, and a size-reducing device is used to reduce the size of the cylinder, whereby the catalyst is accommodated therein. This method requires the diameter to be reduced to the proper degree since the catalyst will be inadequately secured if the diameter is insufficiently reduced, while the catalyst will be damaged it the diameter is excessively reduced. The fact that the diameter can only be reduced to a certain degree means that irregularities may arise in the outside diameter of the cylinder. Specifically, in the semi-finished product wherein the pillar-shaped catalyst wrapped in the mat is housed in the cylinder, the outside diameter of the cylinder may still be irregular even after the diameter of the cylinder has been reduced using a size-reduction device.

Problems associated with a conventional clamp will now be described with reference to FIGS. 10A and 10B.

As shown in FIG. 10A, a semicircular groove 112 corresponding to a reference outside diameter (average outside diameter) of the cylinder 113 is formed in the upper clamp 103. The outside diameter of the cylinder 113 will be larger than the reference outside diameter if the degree of irregularity is excessive. When the upper clamp 103 is clamped on the cylinder 113 having this large outside diameter, left and right corner parts 114, 114 of the semicircular groove 112 come into contact with the outer peripheral surface of the cylinder 113. Therefore, a gap d1 arises in the center of the semicircular groove 112.

In order to achieve a clamped state, it is necessary to lower the upper clamp 103 until the gap d1 disappears. When this is done, the left and right corner parts 114, 114 will cut into the cylinder 113, and the cylinder 113 will locally deform toward the center by an amount equal to the depth of the gap d1. The effect on the catalyst increases according to the extent of local deformation, and the catalyst may suffer damage. A recommended countermeasure addressing this concern is shown in FIG. 10B.

As shown in FIG. 10B, if the size of the upper clamp 103 is halved, a gap d2 will be dramatically smaller than the gap d1. The local deformation is ameliorated, and the effect on the catalyst is lessened.

Dividing the upper clamp 103 and the clamp into increasingly numerous segments thus progressively reduces the size of the gaps and lessens the effect on the catalyst.

However, the clamp 103 is subject to a reactive force from the cylinder 113. When the number of segments increases, the size of the clamp decreases, and the rigidity decreases, leading to concerns that the rigidity will be insufficient.

There is accordingly a demand for a chucking device that reduces the effect on the catalyst while preserving the rigidity of the clamps.

SUMMARY OF THE INVENTION

It is an object of the present invention to provide a chucking technique in which, as a starting material, there is used a semi-finished product having a pillar-shaped catalyst inserted inside a cylinder with a mat interposed therebetween, and having irregularities in outside diameter. When the semi-finished product is spin-processed, the catalyst will be affected to a lesser extent while the rigidity of the clamps will be maintained.

According to the present invention, there is provided a chucking device for use in machining a system for purifying exhaust gas, which device comprises a plurality of pressing pieces for chucking an outer peripheral surface of a cylinder of a semi-finished product to be processed, the semi-finished product being a pillar-shaped catalyst wrapped in a mat and housed in the cylinder; and the chucking device chucking the outer peripheral surface of the cylinder using the plurality of pressing pieces when spinning rollers are pressed against an end part of the cylinder and the end part is spin-processed;

wherein individual surfaces of the plurality of pressing pieces facing the cylinder have a contact surface for touching the cylinder, and a pair of chamfers cut away from either end of the contact surface; and a radius of curvature of the contact surface is set to be half of a reference outside diameter of the cylinder.

When the outside diameter of the cylinder is larger than the reference outside diameter, the two ends of the contact surface will be the only parts in contact with the cylinder when chucking commences. When the chamfers at either end are excluded the contact surface is reduced. A smaller contact surface corresponds to lesser effect on the catalyst. However, the pressing pieces will be subjected to a reactive force from the cylinder, and since they are larger than the contact surfaces, the rigidity of the pressing pieces can be adequately increased. Specifically, it is possible to lessen the effect on the catalyst while maintaining the rigidity of the pressing pieces.

It is preferred that each of the chamfers cut away from either end of the contact surface comprises an arcuate surface, and a radius of curvature of each of the arcuate surfaces is set to a value greater than the radius of curvature of the contact surface.

When the outside diameter of the cylinder is larger than the reference outside diameter, the two ends of the contact surface will be the only parts in contact with the cylinder when chucking commences. As the diameter decreases, the arcuate surfaces also come in contact with the cylinder.

When the chamfers at either end are excluded the contact surface is reduced. A smaller contact surface corresponds to lesser effect on the catalyst. However, the pressing pieces will be subjected to a reactive force from the cylinder, and since they are larger than the contact surfaces, the rigidity of the pressing pieces can be adequately increased. Specifically, it is possible to lessen the effect on the catalyst while maintaining the rigidity of the pressing pieces. In addition, the effect of the pressing force is also applied to the arcuate surfaces during diameter-reduction; therefore, the final shape of the completed product is improved.

It is preferred that a sliding tube slides to cause the plurality of pressing pieces to chuck the outer peripheral surface of the cylinder. Since the sliding action of the sliding tube causes the pressing pieces to move in the vertical direction, fine adjustments can be made to the chucking pressure on the outer peripheral surface of the cylinder.

It is preferred that controlling an oil pressure causes the sliding tube to slide.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1A:
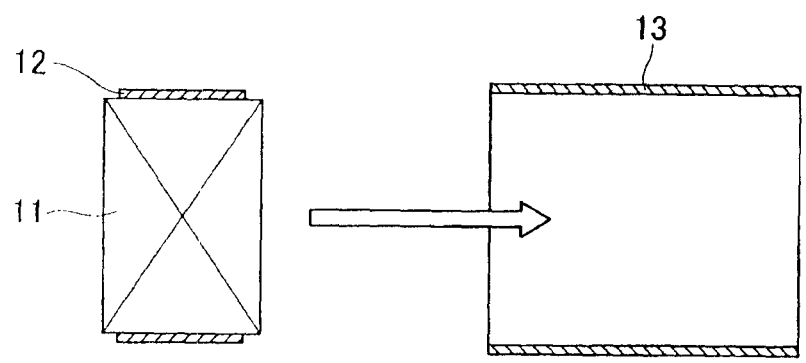
FIGS. 1A and 1B are drawings showing a step for obtaining a semi-finished version of an exhaust pipe.
Figure 1B:
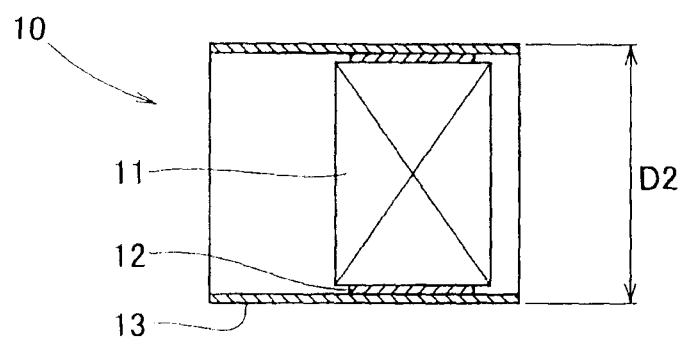

As shown in FIG. 1A, a pillar-shaped catalyst 11 is wrapped in a mat 12 and inserted into a metal cylinder 13. It is thereby possible to obtain a semi-finished version 10 of the exhaust pipe shown in FIG. 1B. It is also possible to provide a diameter-reducing step between the events depicted in FIG. 1A and FIG. 1B, and subject the metal cylinder 13 to a diameter-reducing process. The article obtained after the diameter has been reduced will be the semi-finished product 10. An outside diameter of the semi-finished product 10 is indicated by D2.

Figure 2:
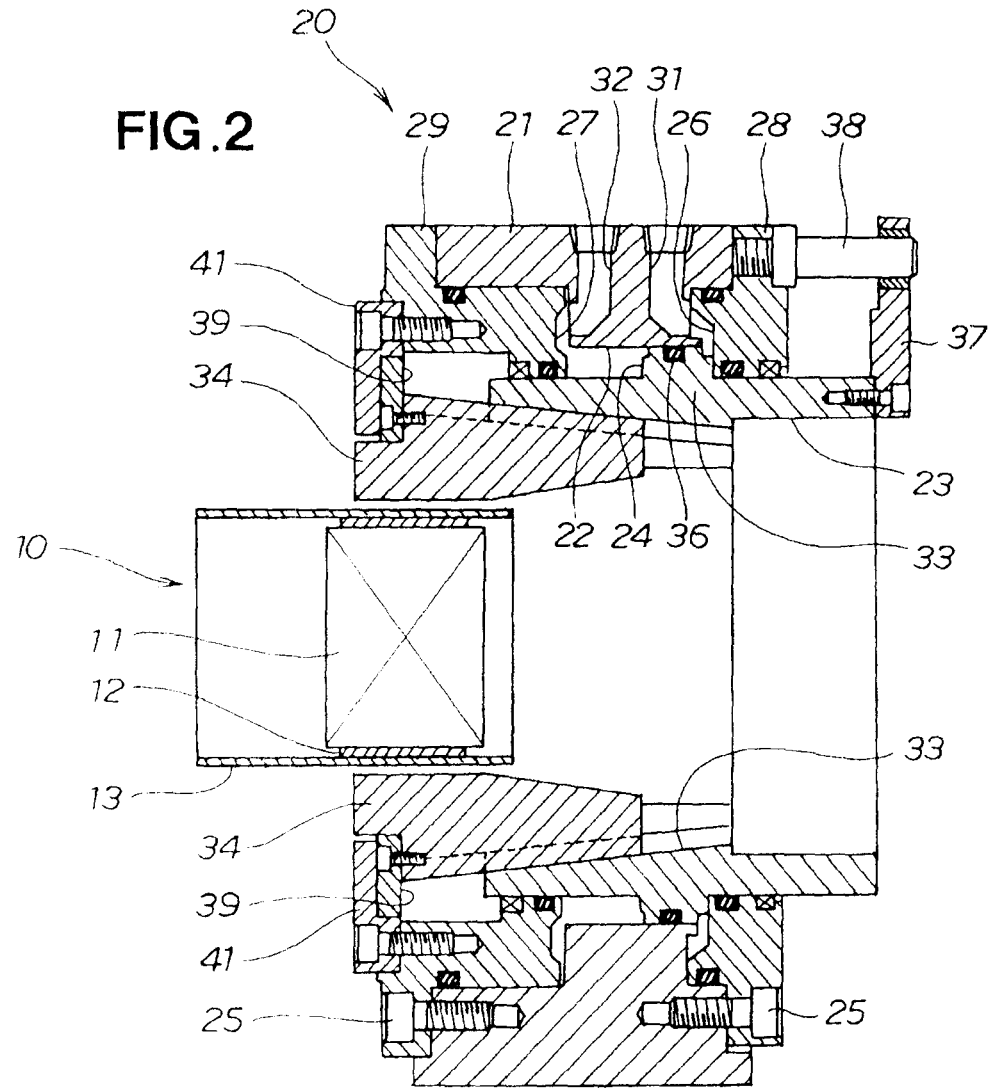
FIG. 2 is a cross-sectional view showing a chucking device according to a first embodiment of the present invention, wherein the semi-finished product of FIG. 1B is being held.

Reference is now made to FIG. 2 showing a chucking device 20 for use in machining an exhaust-gas purifying system. The chucking device 20, which is used for gripping the semi-finished product 10, comprises a case 21; a sliding tube 23 inserted into a large hole 22 opening laterally with respect to the case 21, the sliding tube 23 being capable of moving to the left and right with respect to the drawing; a piston 24 integrally formed in the shape of a flange on an outer periphery of the sliding tube 23; a first cover 28 and a second cover 29 attached to the case 21 by bolts 25, 25 so as to be disposed on either side of the piston 24, and forming a first oil chamber 26 and a second oil chamber 27; a first oil path 31 passing through the case 21 and connecting with the first oil chamber 26; a second oil path 32 passing through the case 21 and connecting with the second oil chamber 27; tapered grooves 33, 33 provided to an inner periphery of the sliding tube 23; and pressing pieces 34, 34 inserted in the tapered grooves 33, 33 so as to be capable of moving to the left and right with respect to the drawing The pressing piece 34 is a segmented piece divided circumferentially into at least eight parts. The reason dictating the number of segments will be discussed hereinafter.

The sliding tube 23 is inserted into the hole 22 of the case 21 with an "O" ring 36, which is fitted on the piston 24, interposed between the case 21 and the sliding tube 23. There is accordingly a risk that the sliding tube 23 will rotate. The sliding tube 23 is therefore connected to the first cover 28 with an arm 37 and a guide pin 38 interposed therebetween, so as to be prevented from rotating.

A plate 39 is provided to the left end of the pressing piece 34, and a stopper ring 41 is provided to the second cover 29. The stopper ring 41 limits the movement of the plate 39, whereby the pressing piece 34 is kept from slipping out of the tapered groove 33. The relationship between the tapered groove 33 and the pressing piece 34 is illustrated in FIG. 3.

Figure 3:
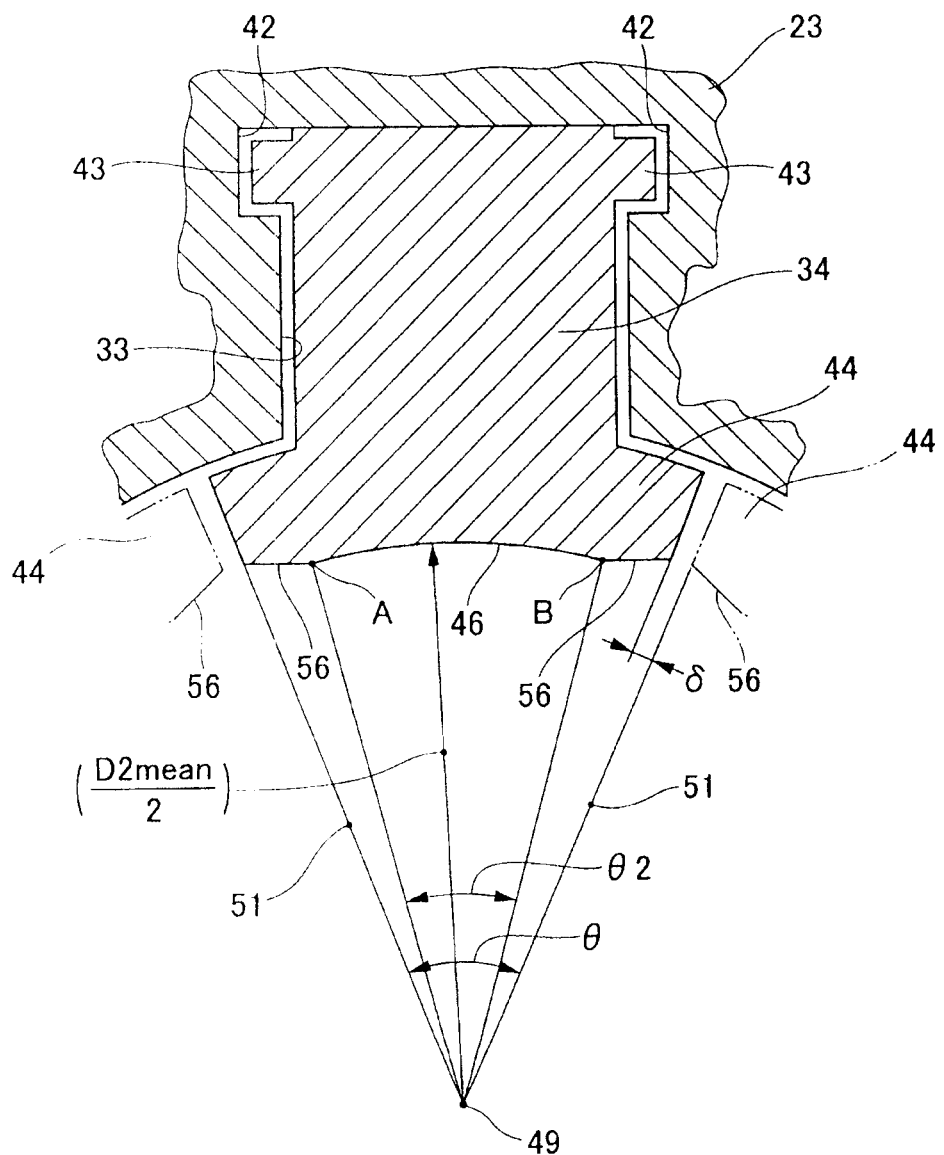
FIG. 3 is a cross-sectional view showing a relationship between a tapered groove of FIG. 2 and pressing pieces.

As shown in FIG. 3, the tapered groove 33 is a T-shaped groove that tapers in the direction perpendicular to the plane of the drawing, and has left and right side grooves 42, 42 provided to its interior (upper portion of the drawing). The pressing piece 34 has protruding parts 43, 43 loosely fitted into the side grooves 42, 42, and there is no concern that the pressing piece 34 will slip downward. Specifically, the pressing piece 34 is supported by the sliding tube 23 so as to move freely in the direction perpendicular to the plane of the drawing.

A leading end of the pressing piece 34 (lower portion of the drawing) is regarded as an arch part 44, and has an arcuate contact surface 46. The arch part 44 and neighboring arch parts 44, 44 shown by the imaginary lines are segmented pieces obtained by dividing a circle into, e.g., eight components.

A central angle θ formed by radii 51, 51 passing through a center 49 of the sliding tube 23 is expressed as 360°/n (where n is the number of segments). In this example, n is 8; therefore, θ is 45°. A gap δ between the arch parts 44, 44 is provided as clearance so as to prevent the arch parts 44, 44 from touching each other when the pressing piece 34 has moved toward the center 49 in order to reduce the diameter.

Chamfers 56, 56 are created on the contact surface 46 of the arch part 44 in the regions to the left of a point A and to the right of a point B, points A, B being established so that a central angle θ2 with respect to their position is 30°. The chamfers 56, 56 correspond to flanks or recessed surfaces, and do not contact the cylinder during chucking.

Figure 4A:
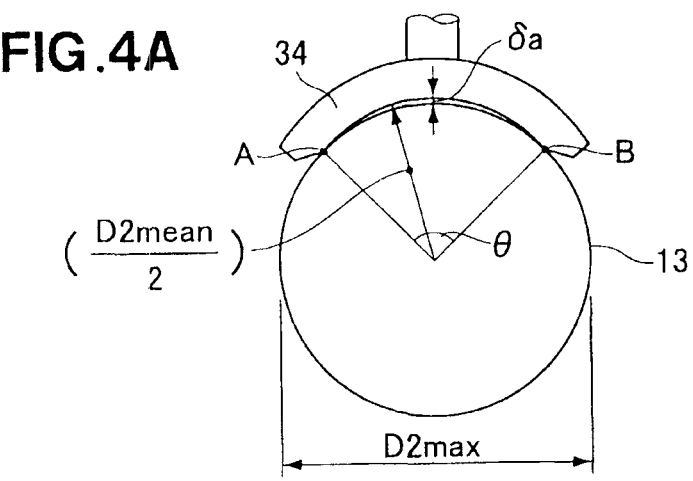
FIG. 4 is a schematic diagram showing a relationship between the pressing pieces of FIG. 3 and a cylinder.

As shown in FIG. 4A, (D2mean/2) is the radius of curvature of the pressing piece 34. When the cylinder 13 having an outside diameter of D2max contacts the pressing piece 34 having this radius of curvature, the difference in the radii causes the contact to occur at point A and point B. As a result, a gap δa forms in the center.

Figure 4B:
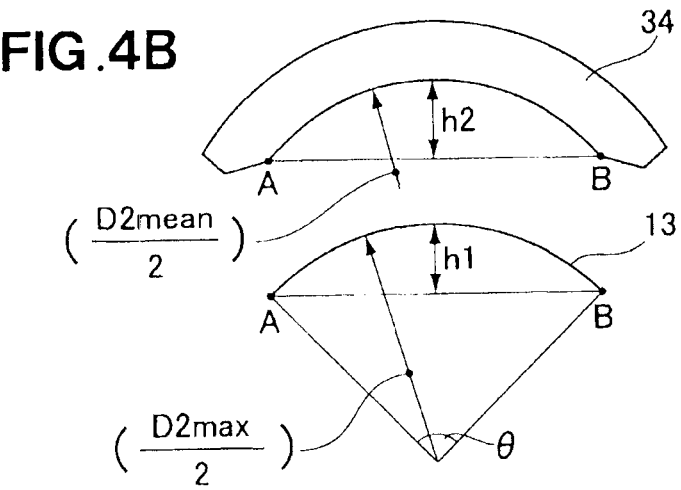

It is possible to determine the value of δa geometrically; the method for calculating the value will be described in simple terms. As shown in FIG. 4B, a difference h1 between a chord connecting point A and point B and the arc is determined using the following: radius−radius×cos(θ/2)=(D2max/2)·(1−cos(θ/2). Similarly, a difference h2 is determined using (D2mean/2)·(1−cos(θ/2). The difference δa between h1 and h2 is ((D2max−D2mean)/2)·(1−cos(θ/2)).

A comparison will now be made between a case in which θ=45° (8 sections), and a case in which θ=30° (12 sections).

When θ=45°, D2max=134 mm, and D2mean=132 mm, then δa is determined to be 0.076 mm using the formula δa=((D2max−D2mean)/2)·(1−cos(θ/2))=((134−132)/2)·(1−cos(45/2))=1·(1−0.924)=0.076 mm.

When θ=30°, D2max=134 mm, and D2mean=132 mm, then δa is determined to be 0.034 mm using the formula δa=((D2max−D2mean)/2)·(1−cos(θ/2))=((134−132)/2)·(1−cos(30/2))=1·(1−0.966)=0.034 mm.

When θ is 45°, δa equals 0.076 mm; however, when θ is 30°, δa is equal to or less than half that value; i.e., 0.034 mm. This fact is significant.

The operation of the abovedescribed chucking device 20 will now be described with reference to FIG. 5.

Figure 5:
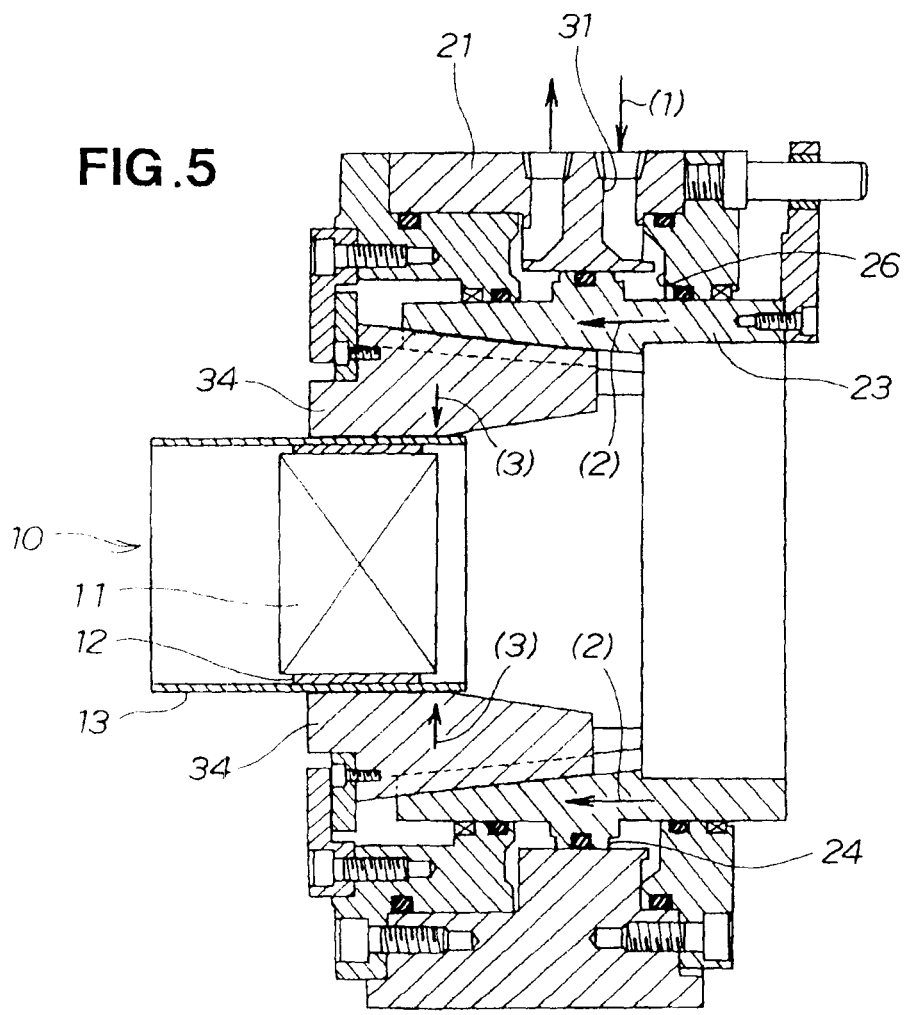
FIG. 5 is a cross-sectional view showing an operational state of the chucking device of FIG. 2.

As shown in FIG. 5, compression oil is supplied to the first oil chamber 26 via the first oil path 31, as indicated by arrow (1), whereupon the sliding tube 23 moves to the left, as shown by arrows (2), (2). Next, the pressing pieces 34, 34 chuck the semi-finished product 10 using a tapering action, as indicated by arrows (3), (3).

The sliding tube 23 moves to the left as the oil pressure increases in the first oil chamber 26, and the semi-finished product 10 can be firmly clamped. Therefore, controlling the oil pressure in the first oil chamber 26 makes it possible to control the clamping force.

The catalyst 11 housed in the semi-finished product 10 is not robust; therefore, the oil pressure is controlled so as to produce a clamping force that will not damage the catalyst 11.

Figure 6A:
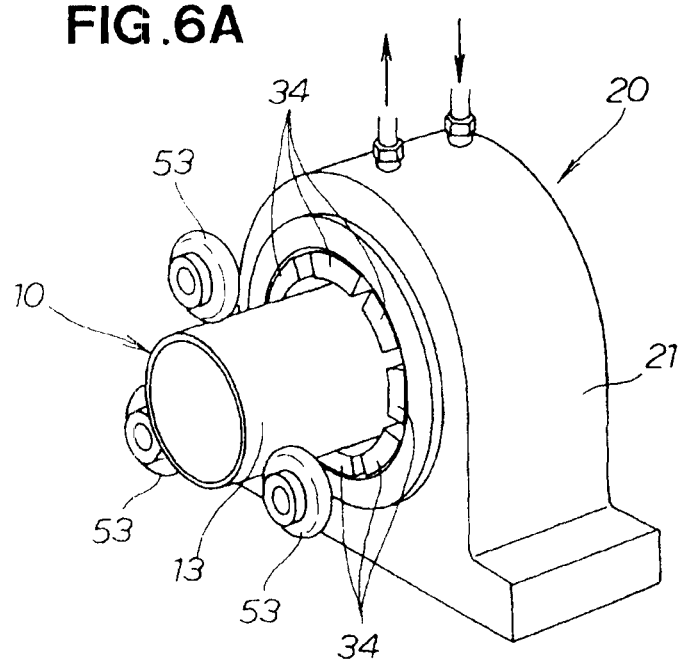
FIG. 6 is a perspective view showing a chucking step and a spinning step according to the present invention.
Figure 6B:
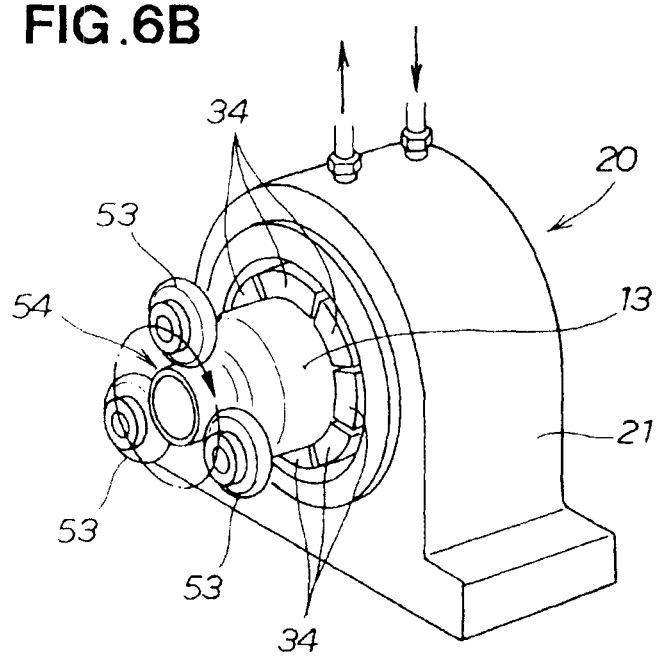

FIGS. 6A and 6B show the chucking step and a spinning step.

As shown in FIG. 6A, the semi-finished product 10 is gently clamped by at least eight pressing pieces 34. Spinning rollers 53, 53, 53 are then positioned on one end of the semi-finished product 10.

As shown in FIG. 6B, the end of the semi-finished product 10 is reduced in diameter while being pressed by the spinning rollers 53, 53, 53, whereby an exhaust-gas purifying system 54 can be obtained.

In FIG. 3, θ is 45° and θ2 is 30°. Specifically, the contact surface 46 is equivalent to one in which twelve segments are present (θ=30°). Specifically, the chucking commences with point A and point B being in contact with the cylinder from the start; therefore, the effect on the catalyst will be the same as if there are twelve segments.

The pressing piece 34 has substantially the same overall cross-sectional area as a pressing piece that is divided into eight segments (θ=45°). Specifically, the pressing piece 34 has the same rigidity as an eight-segment pressing piece. This rigidity is dramatically greater than the rigidity of a twelve-segment pressing piece.

The pressing piece 34 therefore has a reduced effect on the catalyst, as with a twelve-segment pressing piece, while having increased rigidity, as with an eight-segment pressing piece.

Thus, according to the present invention, there is provided a pressing piece 34 capable of ensuring rigidity while reducing the effect on the catalyst.

However, the chamfer 56 to the left of point A and the chamfer 56 shown leftward thereof by the imaginary line do not restrain the cylinder during chucking. The same is true of the chamfer 56 to the right of point A, and the chamfer 56 shown rightward thereof by the imaginary line. With certain types of material, it is conceivable that the cylinder will be distended radially outward in these areas. It is more desirable for there to be an improved design capable of minimizing such distending. Accordingly, a second embodiment will be described with reference to FIG. 7.

Figure 7:
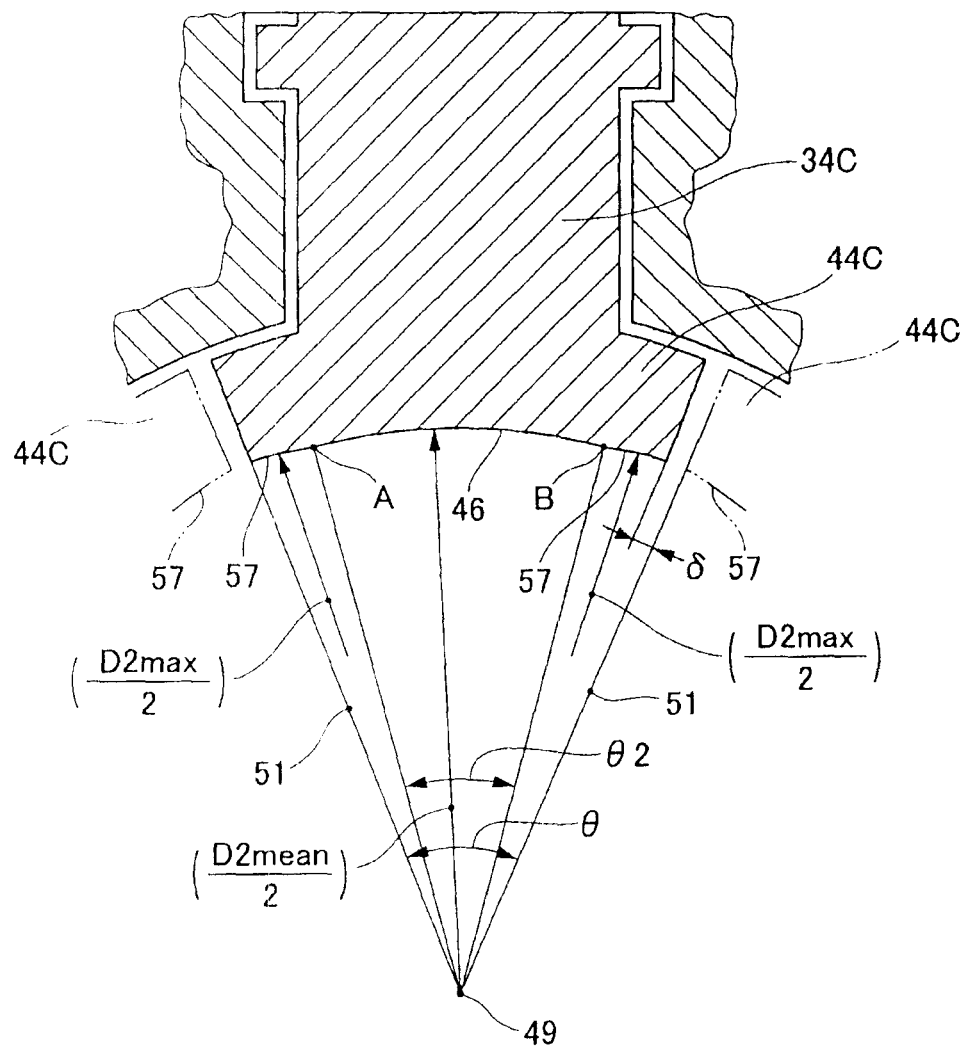
FIG. 7 is a cross-sectional view of a pressing piece according to a second embodiment of the present invention, as an improvement to the first embodiment shown in FIG. 3.
Figure 8A:
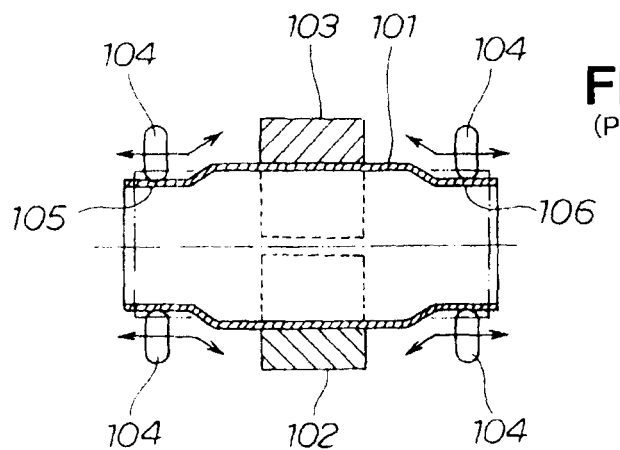
FIG. 8 shows a conventional method for spin-processing.
Figure 8B:
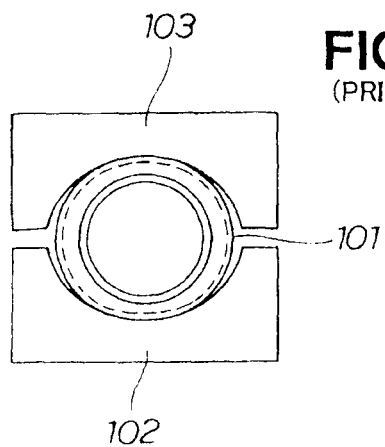
Figure 9:
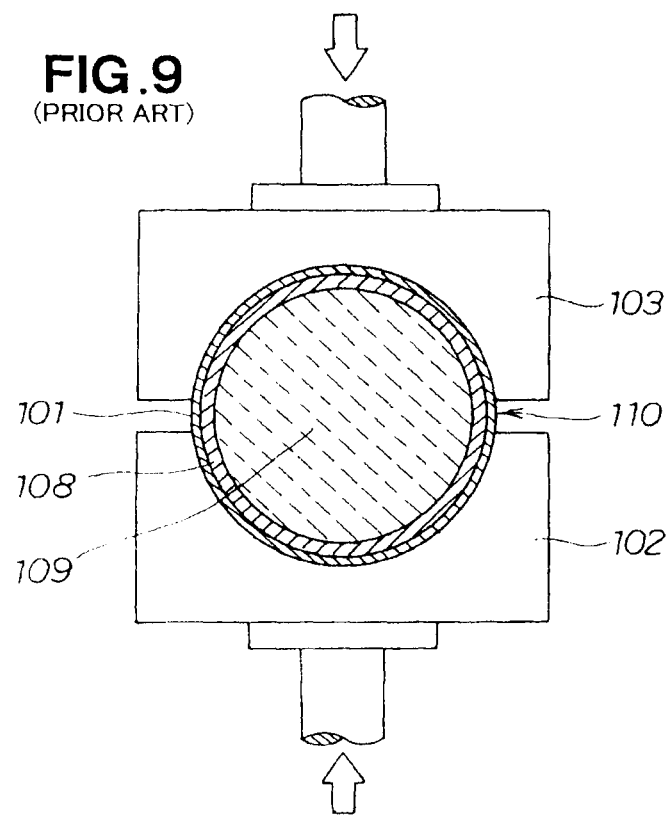
FIG. 9 shows a conventional semi-finished product in a clamped state.
Figure 10A:
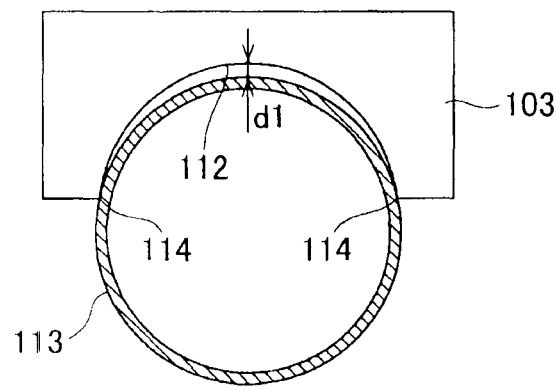
FIG. 10 shows problems concerning conventional clamping.
Figure 10B:
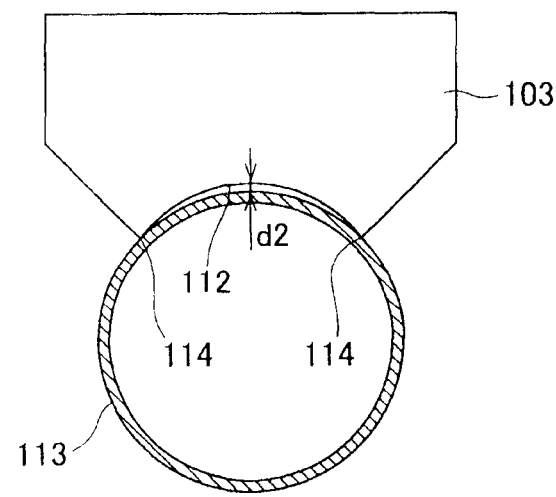

The difference between the second embodiment shown in FIG. 7 and the first embodiment shown in FIG. 3 is that the chamfer is modified to have an arcuate surface having a radius of curvature of D2max/2. The second embodiment is otherwise the same as the embodiment shown in FIG. 3; therefore, the same reference symbols will be used and their description omitted.

Specifically, a pressing piece 34C is segmented into eight arch parts 44C, θ being 45°. A radius of curvature for a contact surface 46 of the arch part 44C is D2mean/2. Arcuate surfaces 57, 57 are created on the contact surface 46 in the regions to the left of a point A and to the right of a point B, points A, B being established so that a central angle θ2 with respect to their position is 30°.

The radius of curvature for the arcuate surfaces 57, 57 is D2max/2, which is larger than D2mean/2.

Only when the outside diameter of the cylinder is D2max will points A, B, and the arcuate surfaces 57, 57 touch the outer peripheral surface of the cylinder when chucking commences. The arcuate surfaces 57, 57 will be in continuous contact with the outer peripheral surface of the cylinder throughout the chucking process.

When the outside diameter of the cylinder is smaller than D2max, points A, B will touch the outer peripheral surface of the cylinder when chucking commences. The arcuate surfaces 57, 57 will touch the outer peripheral surface of the cylinder midway through the chucking process, and will be in continual contact with the outer peripheral surface of the cylinder from that point forward. As a result, there is no concern that the cylinder will be distended radially outward in local regions.

In this example as well, the contact surface 46 is the same as one having twelve segments (θ=30°). Specifically, since the diameter-reducing process commences with point A and point B being in contact with the cylinder from the start, the effect on the catalyst will be the same as if there are twelve segments.

The pressing piece 34C has the high rigidity of an eight-segment pressing piece, and the reduced effect on the catalyst found in a twelve-segment pressing piece.

As described above, it is possible to ensure rigidity while reducing the effect on the catalyst.

In the above examples, θ indicates the angle when there are eight segments, and θ2 indicates the angle when there are twelve segments; however, as long as the relationship θ2<θ is maintained, θ and θ2 can be set as desired. For example, it is possible for θ to indicate the angle when there are two segments, and for θ2 to indicate the angle when there are four segments, or for θ to indicate the angle when there are twelve segments, and θ2 to indicate the angle when there are sixteen segments.

The spin-processing was described in the embodiments as a diameter-reducing process; however, it may also be a diameter-enlarging process.

The chamfers may be designed to have any desired form (including their angle and size).

The present invention is suitable for use in the manufacture of a cylindrical system for purifying exhaust gas to be installed in an exhaust pipe of a vehicle.

Obviously, various minor changes and modifications of the present invention are possible in light of the above teaching. It is therefore to be understood that within the scope of the appended claims the invention may be practiced otherwise than as specifically described.

What is claimed is:

1. A chucking device for machining a cylinder that is part of a system for purifying exhaust gas, the chucking device comprising: a plurality of pressing pieces for chucking an outer peripheral surface of the cylinder, each of the pressing pieces including a contact surface that faces the cylinder and is adapted to touch the cylinder, each of the pressing pieces including a pair of chamfers that face the cylinder and are cut away from either end of the contact surface so as to define arcuate surfaces, wherein a radius of curvature of each of the arcuate surfaces is set to a value greater than a radius of curvature of the contact surface.

2. The chucking device of claim 1, wherein a sliding tube slides to cause the plurality of pressing pieces to chuck the outer peripheral surface of the cylinder.

3. The chucking device of claim 2, wherein controlling an oil pressure causes the sliding tube to slide.

4. A chucking device for machining a cylinder that is part of a system for purifying exhaust gas, the chucking device comprising:
a plurality of pressing pieces for chucking an outer peripheral surface of the cylinder, each of the pressing pieces including a contact surface that faces the cylinder and is adapted to touch the cylinder, each of the pressing pieces including a pair of chamfers that are cut away from either end of the contact surface so as to define arcuate surfaces,
wherein the contact surface defines a radius of curvature this is set to be half of a reference outside diameter of the cylinder and a radius of curvature of each of the arcuate surfaces is set to a value greater than the radius of curvature of the contact surface.

5. The chucking device of claim 4, wherein a sliding tube slides to cause the plurality of pressing pieces to chuck the outer peripheral surface of the cylinder.

6. The chucking device of claim 5, wherein controlling an oil pressure causes the sliding tube to slide.

7. A chucking device for machining a cylinder that is part of a system for purifying exhaust gas, the chucking device comprising: a plurality of pressing pieces for chucking an outer peripheral surface of the cylinder, each of the pressing pieces including a contact surface that faces the cylinder and is adapted to touch the cylinder, each of the pressing pieces including a pair of chamfers that face the cylinder and are cut away from either end of the contact surface so as to define arcuate surfaces, wherein the contact surface defines a radius of curvature this is set to be half of a reference outside diameter of the cylinder, wherein a radius of curvature of each of the arcuate surfaces is set to a value greater than the radius of curvature of the contact surface.

8. The chucking device of claim 7, wherein a sliding tube slides to cause the plurality of pressing pieces to chuck the outer peripheral surface of the cylinder.

9. The chucking device of claim 8, wherein controlling an oil pressure causes the sliding tube to slide.

* * * * *